Figure 1:
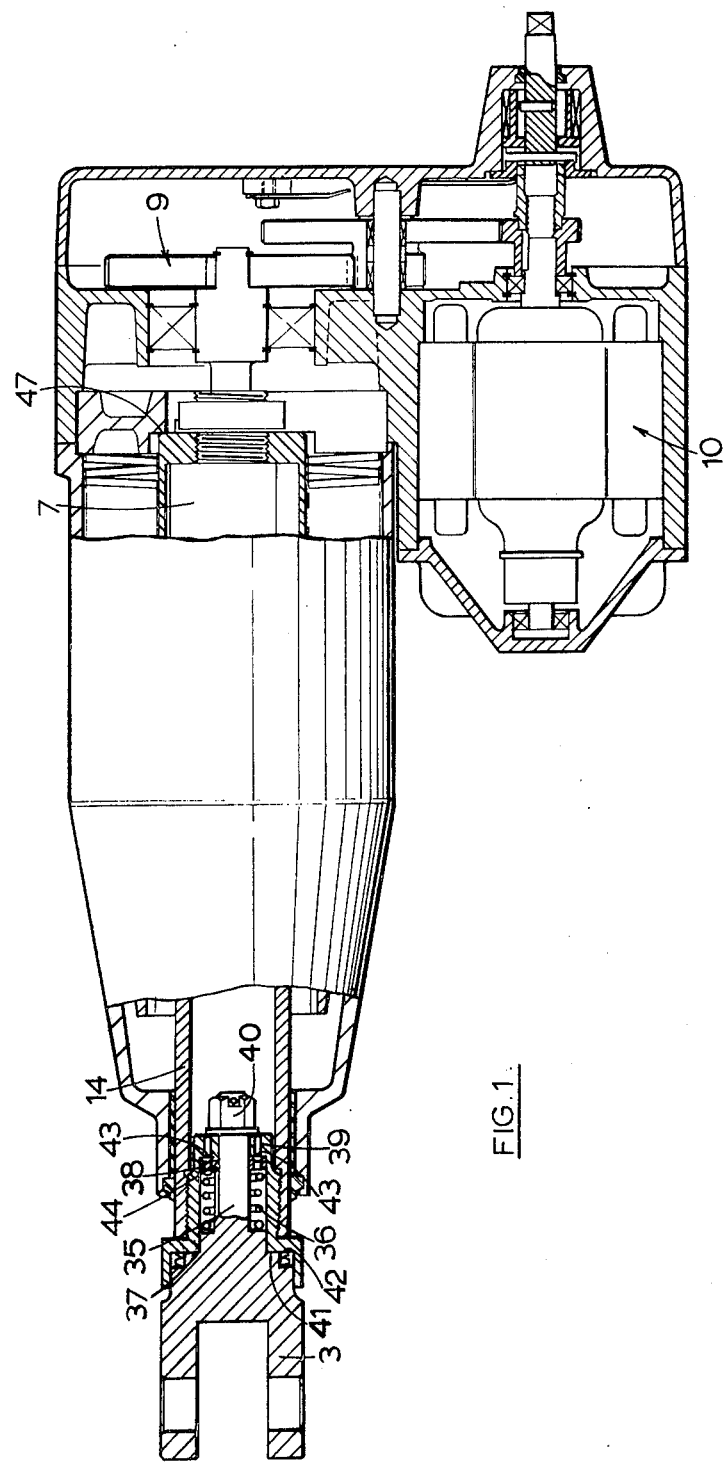

United States Patent [19]

Bayliss

[11] 4,006,801
[45] Feb. 8, 1977

[54] AUTOMATIC SLACK ADJUSTERS FOR VEHICLES

[75] Inventor: John Patrick Bayliss, Redditch, England

[73] Assignee: Girling Limited, Birmingham, England

[22] Filed: Sept. 30, 1975

[21] Appl. No.: 618,226

[30] Foreign Application Priority Data

Oct. 16, 1974 United Kingdom ............ 44743/74

[52] U.S. Cl. .......................... 188/196 BA; 188/162
[51] Int. Cl.² ......................................... F16D 65/56
[58] Field of Search ............ 188/162, 171, 196 BA, 188/196 D; 192/18 B, 111 A

[56] References Cited
UNITED STATES PATENTS

| | | | |
|---|---|---|---|
| 3,467,228 | 9/1969 | Knights | 188/196 BA |
| 3,659,683 | 5/1972 | Betzing | 188/162 |
| 3,682,279 | 8/1972 | Palme et al. | 188/171 |
| 3,822,772 | 7/1974 | Murakami | 192/111 A |

Primary Examiner—Duane A. Reger
Attorney, Agent, or Firm—Scrivener Parker Scrivener and Clarke

[57] ABSTRACT

In a vehicle brake applying assembly a compression spring acts between reatively movable parts normally to urge the parts into an advanced position to maintain a desired braking clearance. After the braking clearance has been taken up the parts are relatively movable into a retracted position against the force in the spring to permit abutment surfaces to engage whereafter a positive brake applying force can be transmitted through the parts.

10 Claims, 2 Drawing Figures

AUTOMATIC SLACK ADJUSTERS FOR VEHICLES

This invention relates to a new or improved vehicle brake applying means, and to a new or improved automatic adjuster for such applying means.

In vehicle brakes it is desirable to maintain braking clearances at a constant value to compensate for wear of friction pads for engagement with braking surfaces on a rotatable braking member and, particularly when the braking mechanism comprises a linkage subjrct to wear and deflection, also to compensate for such linkage wear and deflection. The braking clearances are desirably maintained at predetermined value in the "off" position of brake compatable with local requirements. For example, when the vehicle is a tram adapted to be used in subzero temperatures, it is desirable to maintain the braking clearances at a minimum, for example 1 mm, in order to generate heat thereby melting any ice which has formed on the braking member, for example a wheel, when the brake if in the "off" position.

According to our invention in vehicle brake applying means comprising a load transmitting assembly for transmitting a brake applying force from an actuator to a braking mechanism, and adjuster means for increasing automatically the effective length of the load transmitting assembly to maintain braking clearances at a constant value, the load transmitting assembly incorporates first and second parts which are relatively movable in an axial direction between an advanced position in which the sum length of the parts is at a maximum value and a retracted position in which the sum length of the parts is at a minimum value shorter than the maximum value, a first pair of abutment surfaces being in engagement in said advanced position and being spaced apart in said retracted position, and a second pair of abutment surfaces being spaced apart in said advanced position and being in engagement in said retracted position, and resilient means acts between the first and second parts normally to urge the first and second parts into the advanced position to take up slack and maintain friction pads of a braking mechanism spaced from a rotatable braking member by a distance comprising the braking clearances determined by the adjuster means, the resilient means being overcome after the braking clearances have been taken up on each brake applying movement and the resistance is greater than the loading of the resilient means whereafter the sum length of the parts reduces to the said minimum value and the brake applying force is transmitted to the braking mechanism through the engagement between the second pair of abutment surfaces.

Thus the full brake applying force is only applied to the braking mechanism after the braking clearances have been taken up. Similarly, when the brake is released, operation of the adjuster means can take place only after the resilient means have again extended fully and the first abutment surfaces are again in engagement.

The resilient means preferably comprises a compression spring normally providing a clearance between the second pair of abutment surfaces, and the first and second parts comprise a first portion of a screw-threaded assembly which is rotatable relative to a second portion in response to rotation imparted through the first abutment surfaces which comprise face ratchets, whereby the effective length of the screw-threaded assembly can be increased to compensate for wear of the friction pads.

Conveniently the face ratchets provide a one-way ratchet engagement between a first ratchet member and a second ratchet member, in which the first ratchet member is coupled to the first portion for limited angular movement through an angular distance corresponding to the braking clearances between a first retracted datum position and a second datum position in advance of the first, and the second ratchet member is carried by and freely rotatable with respect to the second portion, a one-way clutch being disposed between the second ratchet member and a spindle rotatable with brake release means to transmit rotation of the spindle through the ratchet members to move the second ratchet member from the first datum position to the second datum position when the brake is released, and angular movement of the second ratchet member beyond the second datum position during release of the brake causing the second portion to rotate relative to the first to increase the effective length of the load transmitting assembly.

Conveniently the first ratchet member is coupled to the first portion by a drive pin received in a circumferentially extending recess in the ratchet member, and opposite ends of the recess define the first and second datum positions.

Preferably a torsion return spring is incorporated to maintain the first ratchet member in a position in which the drive pin engages with the end of the recess defining the first datum position.

In one construction the first portion comprises a nut which is held against rotation and the second portion comprises an adjuster screw. The adjuster screw may comprise the first and second parts which are relatively movable in an axial direction to affect separation of the ratchet members when the brake is applied and after compression of the spring acting normally to hold the abutment surfaces of the parts in a spaced relationship whereby rotation of the second ratchet member with the spindle is not transmitted to the first ratchet member until the abutment faces of the parts are again in the said spaced relationship with the load in the spring being at least equal to a brake reaction load.

The actuator conveniently comprises an actuator of the spring type in which pre-loaded resilient means are normally held in a retracted compressed energy-storing position by retainer means which are operated to release the resilient means when the brake is to be applied with the retainer means comprising the rotatable spindle which is fixed axially and which acts to compress the resilient means through an axially movable carrier and a nut coupled to the carrier and with which the spindle has a screw-threaded engagement.

In such a construction the pitch of the thread of the spindle is the same as that between the nut and the adjuster screw and adjustment takes place when the angular movement of the drive pin engages with the opposite end of the recess in the first ratchet member before the carrier has engaged with a backstop defining its retracted position.

Figure 2:
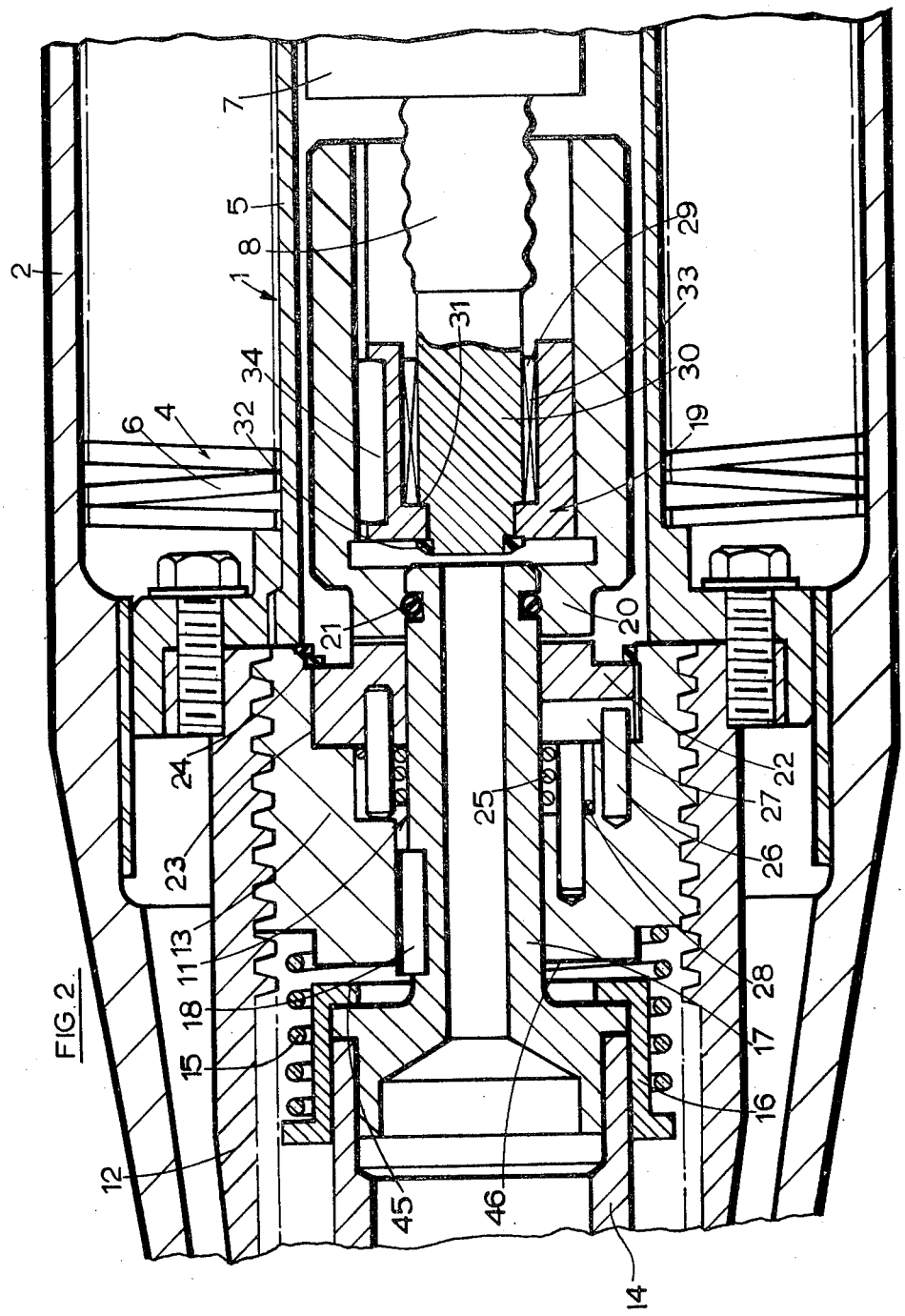

One embodiments of our invention is illustrated in the accompanying drawings in which:

FIG. 1 is a plan incorporating part of a longitudinal section through a spring-operated brake actuator incorporating an automatic slack adjuster; and FIG. 2 is a longitudinal section on an enlarged scale of the un-sectioned portion of FIG. 1.

In the brake actuator illustrated in the drawings a spring carrier 1 guided for axial movement in a housing 2 is moved axially of the housing to apply a brake applying load to a clevis 3 attached to a braking mechanism. The carrier 1 is moved axially in a brake applying direction by the release of energy in a spring assembly 4 which surrounds a central hub 5 of the carrier 1 and comprises a series of plate springs or Belleville washers 6. In the inoperative brake "off" position the spring assembly is held in a compressed energy storing position by means of a ball nut 7 which is coupled to the carrier 1 and an axially fixed ball screw 8 which is adapted to be rotated through a reduction gearing 9 by an electric motor 10. The electric motor and the reduction gearing need not be described further as they are incorporated in the brake which forms the subject of our co-pending patent application Ser. No. 618,227 of even date.

The carrier 1 acts on the clevis 3 through an automatic slack adjuster 11. As illustrated the slack adjuster 11 comprises an adjuster nut 12 which is rigidly fixed to the carrier 1 and extends in a direction opposite to the hub 5. The pitch of the thread in the nut 12 is the same as that of the fixed ball screw 8. An adjuster screw 13 is threadably engaged within the nut 12 and acts on a ram 14 through a compression spring 15 and a spring carrier 16 which forms an abutment for the spring 15 and acts on the ram 14. Normally in a retracted "brakes off" position the carrier 16 is spaced from the adjacent outer end of the screw 13. The ram 14 incorporates a rearwardly directed extension 17 of reduced diameter which extends through and is keyed to the screw 13 against relative rotation by means of a key 18.

The screw 13 is connected to the ball screw 8 by means of a ratchet and clutch assembly 19. The ratchet and clutch assembly 19 comprises a first ratchet member 20 of cup-shaped outline which is rotatably coupled to the free end of the extension 17 by means of a coupler 21, and a second ratchet member 22 which is rotatably mounted on the extension 17 for angular movement through a limited distance and is disposed within a recess 23 in the screw 13 being retained in position by a circlip 24. A compression spring 25 urges mating faces of the ratchet members 20 and 22 into engagement, and these faces are provided with ratchet face teeth arranged to permit relative movement between the members only in one direction when the faces are engaged.

An eccentrically mounted pin 26 projects from the screw 13 into a recess 27 in the ratchet member 22 to limit rotation of the ratchet member 22 with respect to the extension 17 through an angular distance corresponding to the circumferential length of the recess 27. A torsion return spring 28 urges the ratchet member 22 at all times in a direction in which a wall at one end of the recess 27 is engaged with the pin 26.

A clutch housing 29 is rotatably mounted on a plain portion 30 at the free end of the ball screw 8, between a shoulder 31 and a circlip 32, and the housing 29 is coupled to the portion 30 by means of a one-way roller clutch 33. In turn the clutch housing 29 is slidably keyed to the ratchet member 20 for relative axial movement in both directions by means of a key 34.

The clevis 3 is carried by an integral rearwardly directed stepped rod 35 which is received within the outer end of the ram 14 and is coupled to the ram 14 through a ratchet assembly constructed and arranged to permit relative movement between the clevis 3 and the ram 14 in both directions. As illustrated the ratchet assembly comprises a compression spring 36 acting against a shoulder 37 on the rod 35 to urge a ratchet plate 38 slidably keyed to the rod 35 into engagement with an inwardly directed radial shoulder 39 on the ram and through which the rod 35 extends. A nut 40 is screwed onto the free end of the rod 35 to clamp together mating faces 41 and 42 on the clevis 3 and the ram 14 respectively and to maintain the spring 36 in compression. The inner surface of the flange 39 is provided with a plurality of angularly spaced domed projections 43 adapted to be received in complementary apertures 44 within the plate 38.

When it is desired to apply the braking mechanism, the voltage to the motor 10 is reduced so that the energy in the spring assembly 4 is released and urges the carrier 1 towards the end of the housing 2 from which the clevis 3 extends. The force from the spring assembly 4 being is transmitted to the clevis through the carrier 1 the nut 12, the screw-threads, the adjuster screw 13, the spring 15, the carrier 16 and the ram 14. The initial movement of the clevis 3 takes up clearances. When a resistance greater than the load exerted by the sensing spring 15 is encountered, the spring 15 is compressed to allow an abutment face 45 on the carrier 16 to engage with a complementary face 46 on the adjuster screw 13, thereby applying the full force of the spring assembly 14 to the clevis.

The compression of the sensing spring 15 causes the teeth on the ratchet member 22 to separate from the teeth on the ratchet member 20.

When the spring assembly 4 urges the carrier 1 in a brake applying direction, the ball screw 8 is caused to rotate by axial movement of the nut 7 which is coupled to the carrier and the roller clutch 33 prevents the rotation of the screw 8 from being transmitted to the ratchet member 20.

When the brake is released by energising the motor 10, rotation of the screw 8 in the opposite direction is transmitted by the clutch 33 to the ratchet member 20 through the keyed 34. Since the ratchet member 20 is disengaged from the ratchet member 22 rotation of the ratchet member 20 at this stage is not transmitted further.

After a predetermined movement of carrier 5 in a retracted direction has taken place and the reaction load applied by the brake mechanism starts to reduce, a progressively increasing clearance appears between the abutment faces 45 and 46 until the reaction load and the load in the sensing spring are again equal. At this point the ratchet members 20 and 22 are fully engaged so that rotational movement of the ratchet member 20 is transmitted to the ratchet member 22. At this point the braking force applied to a rotatable braking member by friction pads operated by the braking mechanism would be approaching zero.

The rotation of the ratchet member 22 continuous until a point is reached at which a wall at the opposite end of the recess 29 engages with the drive pin 26 against the force in the return torsion spring 28. During this part revolution the friction pads are still being withdrawn from the disc by an amount proportional to the rotation of the screw 8 and the ratchet members 20 and 22.

If the brake mechanism is in good adjustment at the point at which the said opposite end of the recess 29 engages the drive pin 26, the carrier 5 will have reached its backstop defined by an engagement with a fixed abutment face 47 in the housing 2. Thus no further rotation of the ratchet members 20 and 22 will take place. However, if the forward movement of the carrier 5 and the ram 14 is excessive when the brake is applied, in order to compensate for wear of the friction pads and deflections of linkages in the braking mechanism the effective length of an assembly comprising the nut 12, the screw 13, and the ram 14 is increased when the brake is released. Thus, in such a case, when the brake is released rotation of the screw 8 and the ratchet members 20 and 22 will continue beyond the point at which the said opposite end of the recess 29 simply engages with the drive pin 26 to a point at which that rotation causes the adjuster screw 13 to rotate through a corresponding distance until the carrier 5 engages with the backstop 47. This rotation of the adjuster screw 13 is transmitted to the ram 14 through the key 18, and the ratchet assembly permits the ram 14 to rotate with respect to the clevis 3.

In addition to permitting the ram 14 to rotate with respect to the clevis 3, the ratchet assembly also prevents undesirable rotation of the ram 14 due to vibrations. Also the ratchet assembly permits the slack adjuster to be wound back without having to disconnect the clevis 3 from the brake mechanism. This is achieved by engaging a suitable spanner with the ram 14 and rotating the ram to reduce the effective length of the said assembly comprising the nut 12, the screw 13, and the ram 14. Only the torque required to make the ratchet member 22 rotate with respect to the ratchet member 20 is transmitted to the motor 18.

I claim:

1. Vehicle brake applying means comprising a load transmitting assembly for transmitting a brake applying force from an actuator to a braking mechanism, and adjuster means for increasing automatically the effective length of said load transmitting assembly to maintain braking clearances at a constant value, said load transmitting assembly incorporating first and second parts which are relatively movable in an axial direction between an advanced position in which the sum length of said parts is at a maximum value and a retracted position in which the sum length of said parts is at a minimum value shorter than the maximum value, a first pair of abutment surfaces being in engagement in said advanced position and being spaced apart in said retracted position, and a second pair of abutment surfaces being spaced apart in said advanced position and being in engagement in said retracted position, and resilient means acts between said first and second parts normally to urge said first and second parts into said advanced position to take up slack and maintain friction pads of a braking mechanism spaced from a rotatable braking memeber by a distance comprising said braking clearances determined by said adjuster means, said resilient means being overcome after said braking clearances have been taken up on each brake applying movement and the resistance is greater than the loading of said resilient means whereafter the sum length of said parts reduces to the said minimum value and the brake applying force is transmitted to said braking mechanism through an engagement between said second pair of abutment surfaces.

2. Vehicle brake applying means as claimed in claim 1, wherein said resilient means comprises a compression spring normally providing a clearance between said second pair of abutment surfaces, and said first and second parts comprise a first portion of a screw-threaded assembly which is rotatable relative to a second portion in response to rotation imparted through said first abutment surfaces which comprise face ratchets, whereby the effective length of said screw-threaded assembly can be increased to compensate for wear of said friction pads.

3. Vehicle brake applying means as claimed in claim 2, wherein said face ratchets provide a one-way ratchet engagement between a first ratchet member and a second ratchet member, and wherein said first ratchet member is coupled to said first portion for limited angular movement through an angular distance corresponding to said braking clearances between a first retracted datum position and a second datum position in advance of said first datum position, and said second ratchet member is carried by an freely rotatable with respect to said second portion, brake release means, a spindle rotatable with said brake release means, a one-way clutch disposed between said second ratchet member and said spindle to transmit rotation of said spindle through said ratchet members to move said second ratchet member from said first datum position to said second datum position when the brake is released, and angular movement of said second ratchet member beyond the second datum position during release of the brake causing said second portion to rotate relative to the first to increase the effective length of said load transmitting assembly.

4. Vehicle brake applying means as claimed in claim 3, wherein a drive pin couples said first ratchet member to said first portion, and said first ratchet member has a circumferentially extending recess of which opposite ends define said first and second datum positions, said drive pin being received in said recess.

5. Vehicle brake applying means as claimed in claim 4, wherein a torsion return spring is incorporated normally to maintain said first ratchet member in a position in which said drive pin engages with the one end of said recess which defines said first datum position.

6. Vehicle brake applying means as claimed in claim 5, including a backstop to define said retracted position, wherein adjustment takes place only when angular movement of said drive pin engages with the end of said recess opposite the said one end before said backstop is engaged.

7. Vehicle brake applying means as claimed in claim 1, wherein said first portion comprises a nut, and means are provided for holding said nut against rotation, said second portion comprising an adjuster screw.

8. Vehicle brake applying means as claimed in claim 7, wherein said adjuster screw comprises said first and second parts which are relatively movable in an axial direction to affect separation of said ratchet member when the brake is applied and after compression of said resilient means acting normally to hold said abutment surfaces of said parts in a spaced relationship whereby rotation of said second ratchet member is not transmitted to said first ratchet member until said abutment faces of said parts are again in the said spaced relationship with said load in said resilient means being at least equal to a brake reaction load.

9. Vehicle brake applying means as claimed in claim 1, wherein said actuator comprises an actuator of the spring type comprising pre-loaded resilient means, retainer means for holding said pre-loaded resilient means in a compressed energy-storing position, means for releasing said retainer means when the brake is to be applied, said retainer means comprising an axially fixed rotatable threaded spindle, an axially movable carrier acting on said resilient means, a nut coupled to said carrier and with which said spindle is threadably engaged whereby rotation of said spindle causes said carrier to move axially.

10. Vehicle brake applying means as claimed in claim 9, wherein the pitch of said thread of said spindle is the same as that between said nut and said adjuster screw.

* * * * *